(No Model.)
P. ROUSH & C. P. TENER.
FLOOD FENCE.
No. 275,713. Patented Apr. 10, 1883.
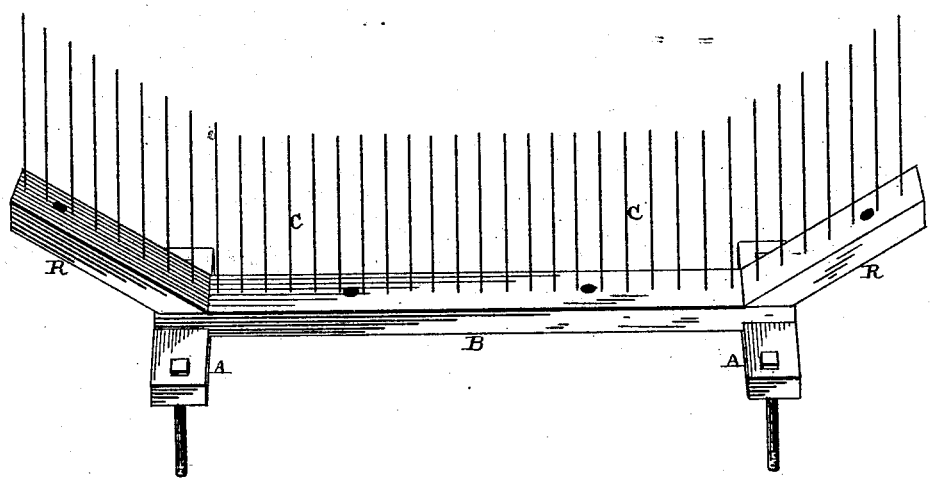

United States Patent Office.

PHILIP ROUSH AND COMMODORE P. TENER, OF RUSSELL'S STATION, OHIO.

FLOOD-FENCE.

SPECIFICATION forming part of Letters Patent No. 275,713, dated April 10, 1883.

Application filed December 30, 1882. (No model.)

*To all whom it may concern:*

Be it known that we, PHILIP ROUSH and COMMODORE P. TENER, of Russell's Station, in the county of Highland and State of Ohio, have invented certain new and useful Improvements in Flood Fences or Gates; and we do hereby declare the following to be a full, clear, and exact description of the invention, such as will enable others skilled in the art to which it pertains to make and use it, reference being had to the accompanying drawing, which forms part of this specification.

My invention relates to an improvement in fences and flood fences or gates; and it consists in the combination of a suitable timber which is placed in the bed of the stream or on the ground, and which has a number of separate and independent springs, wires, or rods projecting upward from its top, which rods or springs form a fence which prevents the passage of animals at all times, and which springs or rods will bend downward for the purpose of allowing the drift to pass over them, and then resume a vertical position, all of which will be more fully described hereinafter.

The object of our invention is to provide a flood gate or fence in which every spring or rod is made entirely separate and independent of the others in every way.

The accompanying drawing represents a perspective of our invention.

A A represent two short sills or sleepers, which are sunk in the ground on opposite sides of the stream; and B, the sill, which has its end secured to these sleepers at right angles, so as to extend across the bed of the stream. The timbers A A may be entirely dispensed with, if so desired, and the sill B will then be secured in position by means of spikes driven down through the sill; or, in case the bed of the stream is formed of solid rock, holes may be drilled in the rock and the spikes passed down through the sill into the holes, and then secured in any suitable manner. Where the banks of the stream are inclined upward, and it is desired that the fence should extend along up the banks, additional pieces, R, also provided with the springs and having their lower ends beveled away, will be used. These inclined pieces will be held in place upon the sill by having a series of holes made through their lower ends, through which the springs or rods upon the sill will pass. The springs in this manner serve the double purpose of forming a part of the fence and holding the parts R in position.

Secured to the sill B in any suitable manner are a number of springs, rods, or wires, C, of any suitable construction that may be preferred, each one of which is entirely separate and independent from the others. These rods, wires, or springs extend upward from the sill at any suitable angle, and form a fence or gate across the stream for the purpose of preventing the passage of animals. While the water is low these rods retain a vertical position; but when the water rises and brings down with it logs and other floating bodies, as soon as the bodies strike against these wires or springs, the wires or springs that are struck by the body bend or incline down the stream sufficiently to allow the body to float on past them, and then the springs instantly resume their vertical position.

Where rods are attached to a sill or sleeper which is intended to be returned to its position, after having been moved by the floating bodies in the water, by means of springs, the sand and dirt in the water soon pack around the spring and under the sill in such a manner that the sill and spring both cease to operate, and then the fence or gate will no longer act as was intended. By using separate and independent springs, as here shown, their action can never be impeded by sand or dirt, and in case one or two should become clogged in any manner this will not interfere with the action of the others.

Having thus described our invention, we claim—

A flood gate or fence composed of a rigid base with a series of springs, rods, or wires which are secured thereto at the lower ends, the free ends of the springs, rods, or wires being free to give before any moving body and then spring back into place again, substantially as shown.

In testimony whereof we affix our signatures in presence of two witnesses.

PHILIP ROUSH.
COMMODORE P. TENER.

Witnesses:
W. W. BRITTON,
E. G. BOATRIGHT.